United States Patent
Kim

(10) Patent No.: US 7,993,234 B2
(45) Date of Patent: Aug. 9, 2011

(54) TRANSMISSION AND TRANSPORT DEVICE INCLUDING TRAIN USING THE TRANSMISSION

(75) Inventor: Jong-Dae Kim, Chungcheongnam-Do (KR)

(73) Assignee: Shingu Auto Mobis Co., Ltd., Chungcheongnam-Do (KR)

( * ) Notice: Subject to any disclaimer, the term of this patent is extended or adjusted under 35 U.S.C. 154(b) by 475 days.

(21) Appl. No.: 12/251,299

(22) Filed: Oct. 14, 2008

(65) Prior Publication Data
US 2009/0105029 A1   Apr. 23, 2009

(30) Foreign Application Priority Data
Oct. 18, 2007   (KR) .................. 10-2007-0104899

(51) Int. Cl.
*F16H 48/06* (2006.01)
(52) U.S. Cl. ..................................................... 475/221
(58) Field of Classification Search .................. 475/204, 475/218, 221, 329
See application file for complete search history.

(56) References Cited

U.S. PATENT DOCUMENTS

| | | | | |
|---|---|---|---|---|
| 6,117,038 | A * | 9/2000 | Nishiji et al. | 475/221 |
| 6,604,591 | B2 * | 8/2003 | Bowen et al. | 180/65.6 |
| 2002/0091031 | A1 * | 7/2002 | Johnson | 475/221 |

* cited by examiner

*Primary Examiner* — Edwin A. Young
(74) *Attorney, Agent, or Firm* — Dykema Gossett PLLC

(57) ABSTRACT

A transmission and a motor or non-motor type transport device including a cross-coupling power train using the transmission, such as chainless bicycle or wagon with two or four wheels are disclosed. The transmission includes a coarse adjustment gearshift of internal gear type and a fine adjustment gearshift of differential gear type which are mounted on a main shaft to change the speed and are selectively connected to each other by a shift lever to provide low-speed rotation and high-speed rotation.

18 Claims, 15 Drawing Sheets

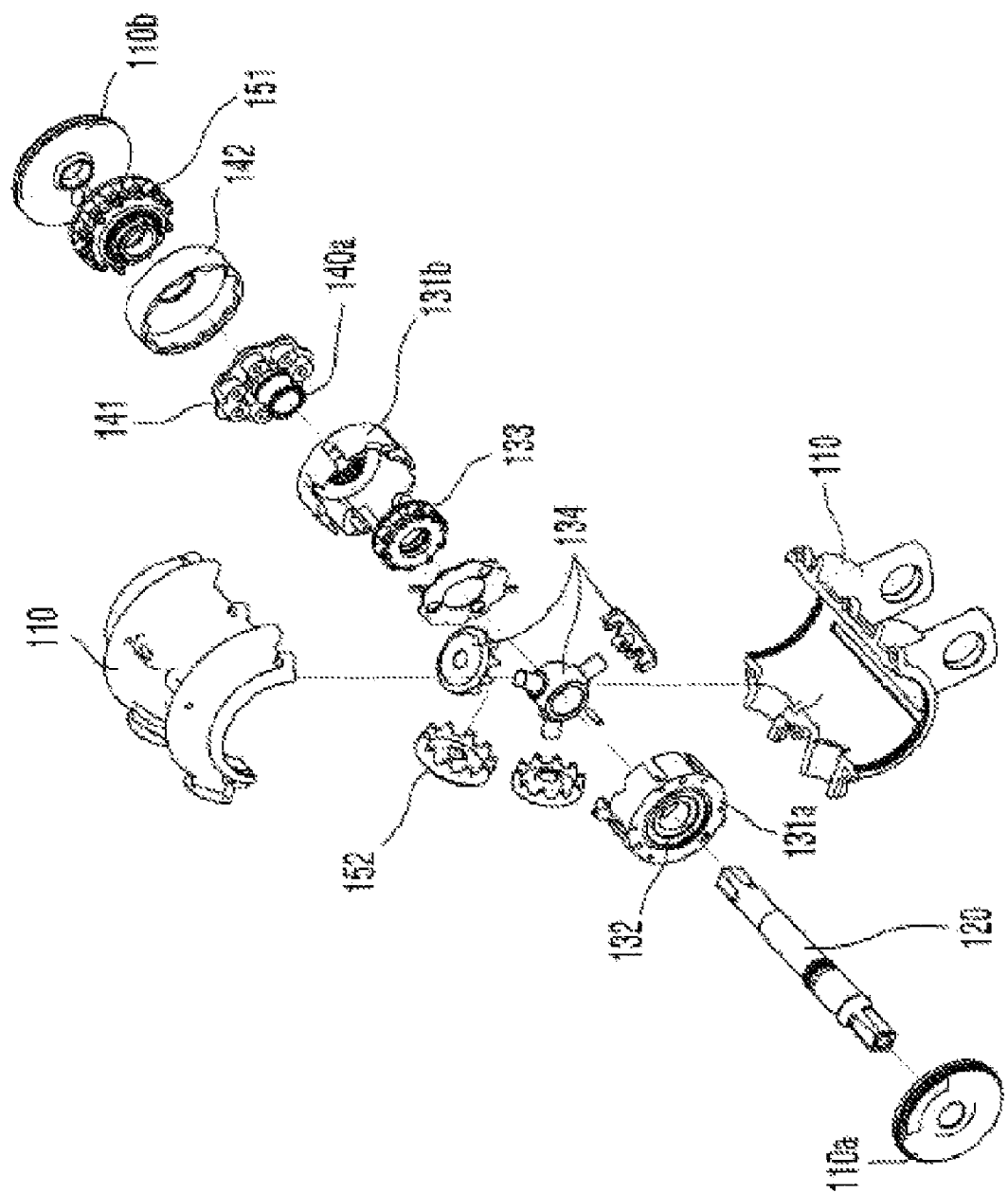

TRANSMISSION AND TRANSPORT DEVICE INCLUDING TRAIN USING THE TRANSMISSION

BACKGROUND OF THE INVENTION

1. Field of the Invention

The present invention relates to a transmission and a motor or non-motor type transport device including a cross-coupling power train using the transmission, such as chainless bicycle or wagon with two or four wheels.

2. Background of the Related Art

A transport device such as bicycle or wagon is self-propelled, and is classified into a non-motor type which transmits a pedal force to a rear wheel(s) via a pedal, a crank arm and a chain, and a motor type which transmits a driving force from an engine to a rear wheel(s) via a chain.

Such a transport device is necessarily provided with a power train for transmitting a pedal force or a driving force of an engine to a rear wheel(s) in order for its operation.

The power train of the transport device includes a transmission for increasing the pedal force or the driving force of the engine and increasing or reducing speed to change a gear ratio in accordance with road conditions or operation. The transmission employs sprockets of various sizes which are arranged in order, and chains for connecting the sprockets.

The construction of the transmission employing the sprockets and the chains is complicated and is limited to a shift range. Also, since the driving force is not smoothly transmitted by the chains connecting the sprockets which are arranged in order, the shift change is not smoothly and quickly performed.

More specifically, in case where the shift is performed from a high stage to a low stage or vice versa while skipping over an adjacent stage, the shift operation should pass through sprockets arranged between both gearshifts, as described above. Also, since a traveling distance should be required for the sequential shift process, it is not easy to instantaneously change the gearshift at low or high speed, for example, on a sloping road.

Although the traveling to operate the transmission using the multi-stage sprocket and chain is not out of the question on a flat road, the shift is not smoothly performed on an uphill road or downhill road, thereby inefficiently transmitting the driving power and thus causing unnecessary energy loss. Also, the transport device cannot travel on a steep or irregular slope, which deteriorates the performance of the transport device.

In order to improve the construction of a power transmission system and reducing the power loss, power trains for a chainless transport device have been developed. One example of the power trains is a bicycle using a cross-coupling power train.

More specifically, a cross-coupling power train including a bevel gear or a crown type gear and a roller type gear is installed between a main shaft of a crank arm and a rear wheel to transmit the driving force from the crank arm to the rear wheel.

Also, the cross-coupling power train includes a transmission operated by the shift lever which is provided on a handle bar, so as to drive the bicycle by properly shifting the transmission in accordance with conditions of travel roads, such as a flat road or slope road. In this instance, the transmission of the power train includes a cross-coupling power transmitting system, planetary or sun gears, or large and small spur gears which are arranged in a multi-stage and are sequentially connected to each other to change the speed.

However, the transmission has a narrow shift range, in which a shift stage is gradually moved at a constant ratio within a certain shift width. Also, under the specific traveling conditions requiring for spontaneous low-speed shift on a slope road, the shift operation of the transmission is not easily performed due to the required traveling distance or strong load.

Also, the power transmission is not effectively performed since the proper shift is not carried out on the slope road, so that the bicycle does not properly travel. In case of a mountain area having an irregular steep slope which requires a large shift ratio, a driver stops off the bicycle since the speed does not changed by strong torque and low rotation at a low-speed stage.

In the transmission applied to the power train for transport devices such as bicycle or wagon, the torque is maximized at a constant speed, while strong torque and low rotation are required at initial drive or on a slope road. As the speed is increased, the transmission increases the rotation rather than the torque. The low- or high-speed shift operation should be quickly carried out in accordance with the traveling conditions, in particular, on an uphill or downhill road.

In case of mountain bikes, the low-speed shift of low rotation and strong torque is required on a mountain area including irregular and steep slopes, but the shift is not properly performed to make the continuous travel impossible.

SUMMARY OF THE INVENTION

Accordingly, the present invention is directed to a mounting structure of an advertising display frame for a shopping cart that substantially obviates one or more problems due to limitations and disadvantages of the related art.

One object of the present invention is to provide a transmission which can effectively transmit a driving force by selectively performing speed change while maintaining a wide range of low- or high-speed shift ratio.

In order to accomplish these objects, there is provided a transmission including a coarse adjustment gearshift of internal gear type and a fine adjustment gearshift of differential gear type which are mounted on a main shaft to change the speed and are selectively connected to each other by a shift lever to provide low-speed rotation and high-speed rotation. The transmission solves the problem contained in the prior art, in which the strong torque and low rotation are not obtained when sudden load requiring a large shift difference occurs, since the shift is gradually performed in a narrow shift range.

According to another aspect of the present invention, there is provided a 2-wheel or 4-wheel chainless transport device such as a bicycle or wagon including the above transmission which can effectively transmit the driving force at a wide shift range. The transmission can perform the selective shift at each low or high stage in accordance with traveling conditions such as a flat road or slope road. In particular, the transport device can continuously travel even on mountain area including irregular steep slopes, without stopping over the transport device, since it can obtain the strong torque and low rotation, as well as freely changing the sped on the slope road.

With the above construction, since the coarse adjustment gearshift and the fine adjustment gearshift are selectively connected to each other, the transmission of the present invention can obtain a wide shift range at low and high sped rotation.

The transport device according to the present invention can quickly change the speed, without requiring a traveling distance for the shift on an irregular slope road in a mountain area, and stopping over the transport device.

Also, the present invention can effectively transmit a driving force while maintaining a wide shift range of low or high speed, and can reduce energy loss.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 3 is an exploded perspective view of a transmission according to an embodiment of the present invention;

FIG. 4a is a cross-sectional view taken along line A-A in FIG. 2a;

FIG. 4b is a cross-sectional view taken along line B-B in FIG. 2a;

FIGS. 5a to 5e are views explaining a shift process of a transmission according to the present invention, in which FIGS. 5a and 5b show a shift process of low-speed 1- and 2-stages, and FIGS. 5c to 5e show a shift process of high-speed 1-, 2-, and 3-stages;

DETAILED DESCRIPTION OF THE PREFERRED EMBODIMENTS

A preferred embodiment according to the present invention will now be explained with reference to the accompanying drawings.

The present invention may be applied to power transmitting systems which transmit a driving force to a load to drive a motor type or non-motor type transport device.

Figure 1:
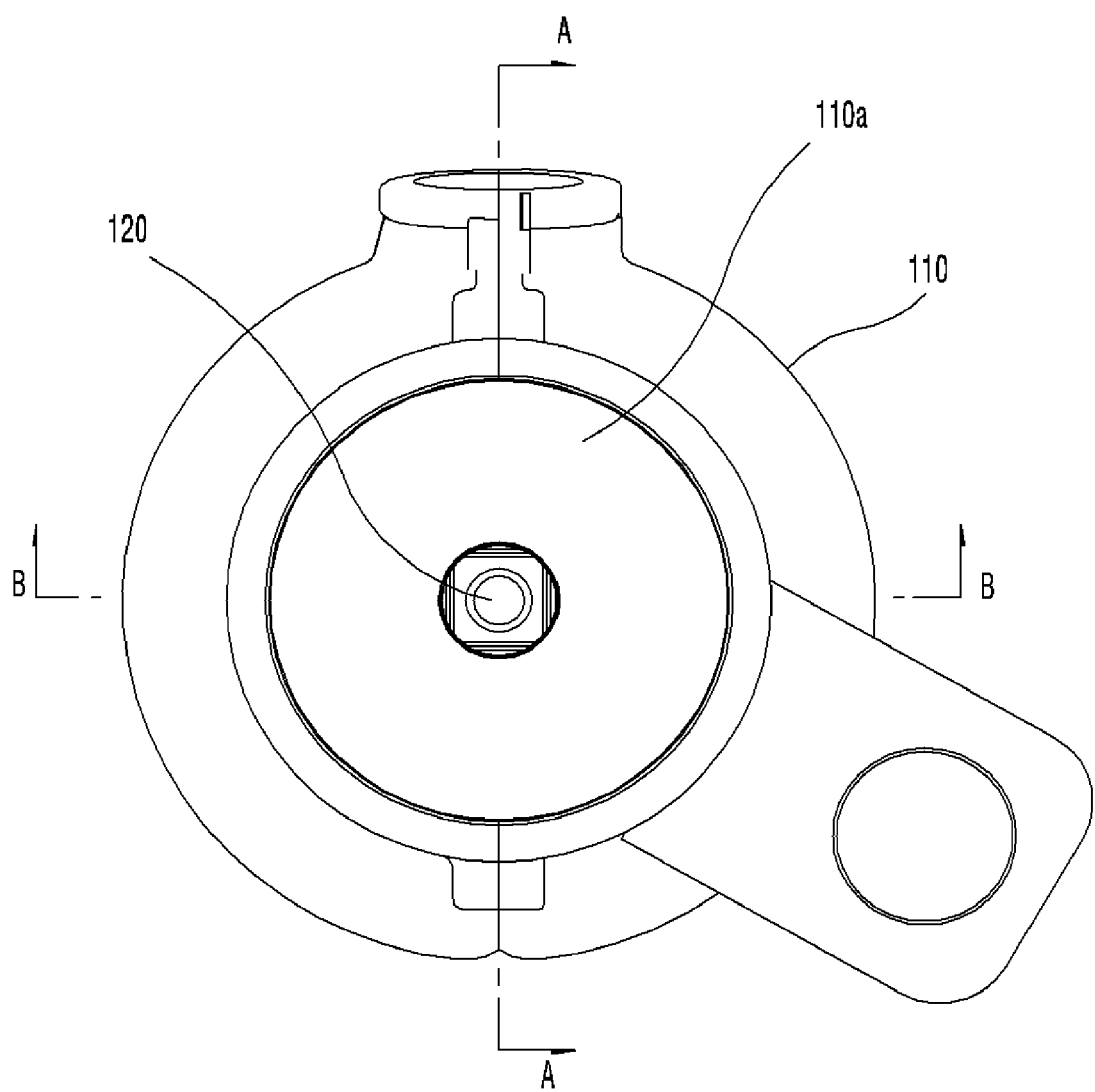
FIG. 1 is a side view illustrating a transmission according to a preferred embodiment of the present invention.

FIGS. 1 to 3 show a transmission according to the present invention which is installed in a proper position in a power transmitting system and is shifted by a shift lever to effectively transmit a driving force to a load. The transmission includes a two-segmented housing 110 enclosing components to be described hereinafter.

The housing 110 includes a main shaft 120 for receiving the driving force in a horizontal direction in an inside of the housing. A fine adjustment gearshift 130 for fine shift, a coarse adjustment gearshift 140 for low and high speed shift, and outputs 150 are arranged on the main shaft 120. Both ends of the housing 110 are enclosed by covers 110a and 110b.

The respective components built in the housing 110 will now be described in detail.

Figure 2A:
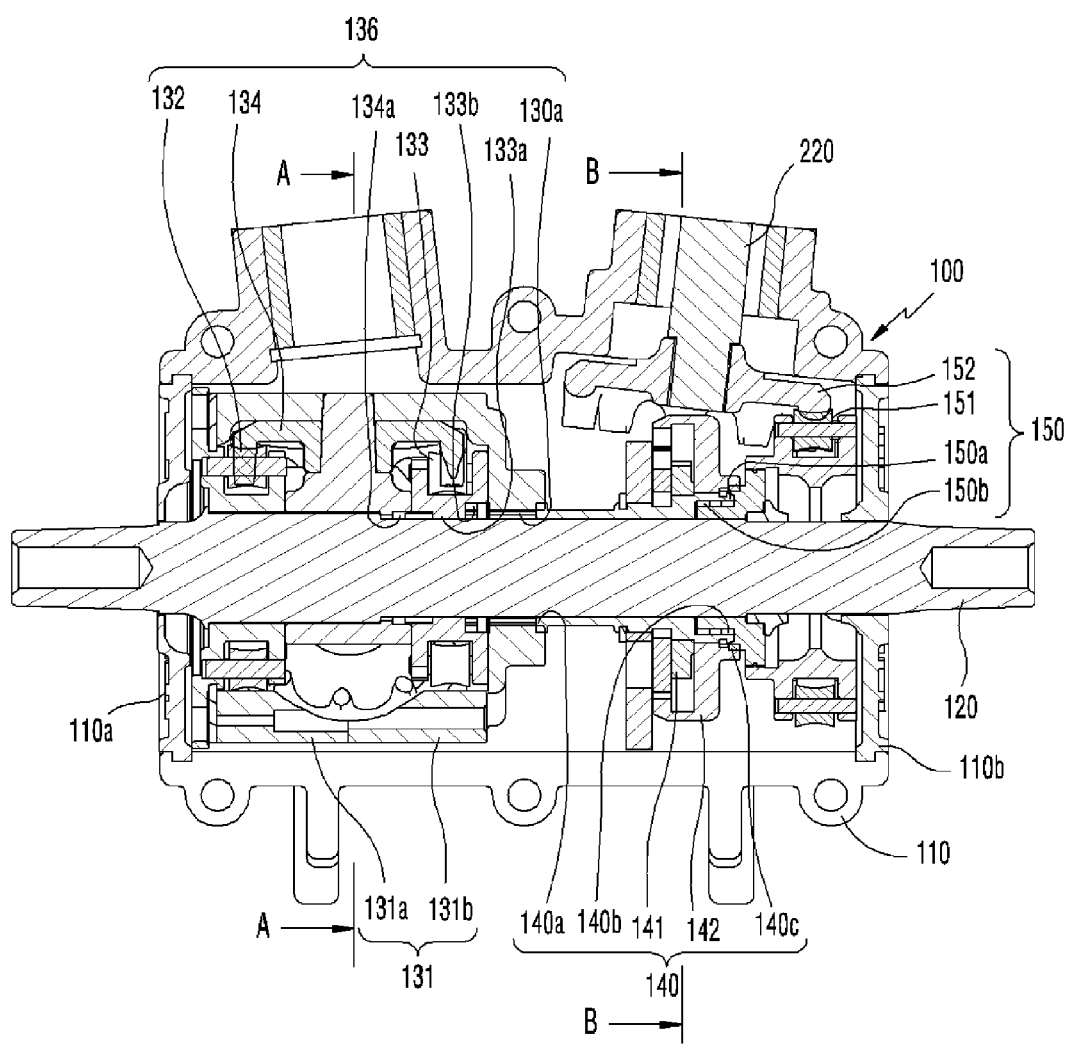
FIG. 2a is a cross-sectional view taken along line A-A in FIG. 1.
Figure 2B:
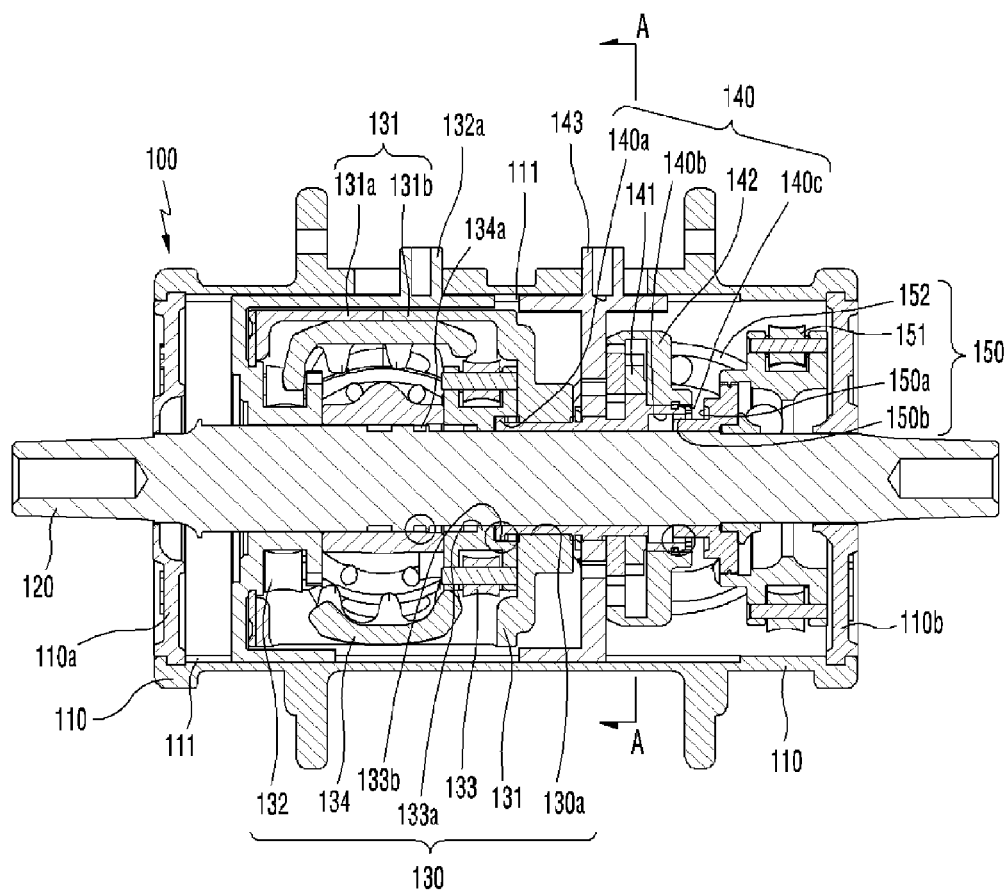
FIG. 2b is a cross-sectional view taken along line B-B in FIG. 1.
Figure 4A:
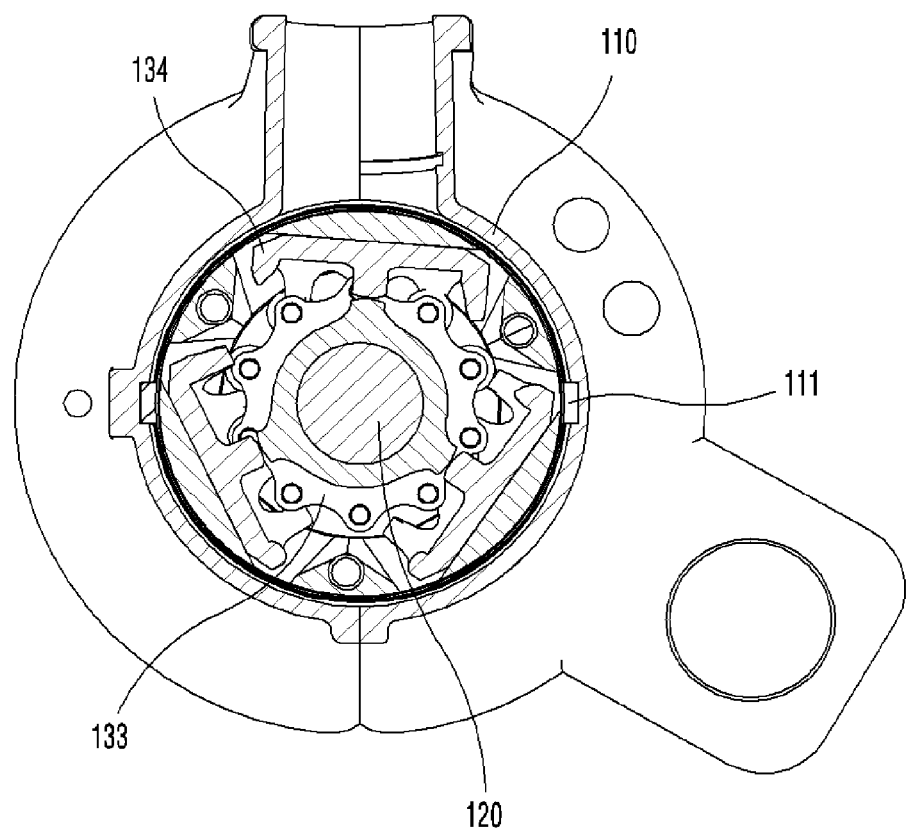

First, the fine adjustment gearshift 130 is mounted on the main shaft 120, as shown in FIGS. 2a, 2b and 4a, and is moved in a left or right direction along a guide path 111 provided on an inner wall of the housing 110 by manipulating a shift lever. The fine adjustment gearshift 130 is used as a differential gear, in which the driving force is transmitted to any one of two input paths and is outputted to a fine adjustment stage.

The fine adjustment gearshift 130 includes a casing 131 freely rotated around the main shaft 120, the casing 131 consisting of a pair of half bodies 131a and 131b each having a first output 13a at its distal end.

The casing 131 includes a stationary side gear 132 idling on the main shaft 120 and having a coupling end 132a applied with a operation force from the shift lever, a movable side gear 133 having an input 133a which is selectively connected to or disconnected from the main shaft 120 through spline shaft coupling and a second output 133b, and at least one pinion 134 meshed with the stationary or movable side gear 132 or 133 and having an input 134a which is selectively connected to or disconnected from the main shaft 120 through spline shaft coupling, the pinion being coupled to the casing 131 to revolve or rotate.

Figure 4B:
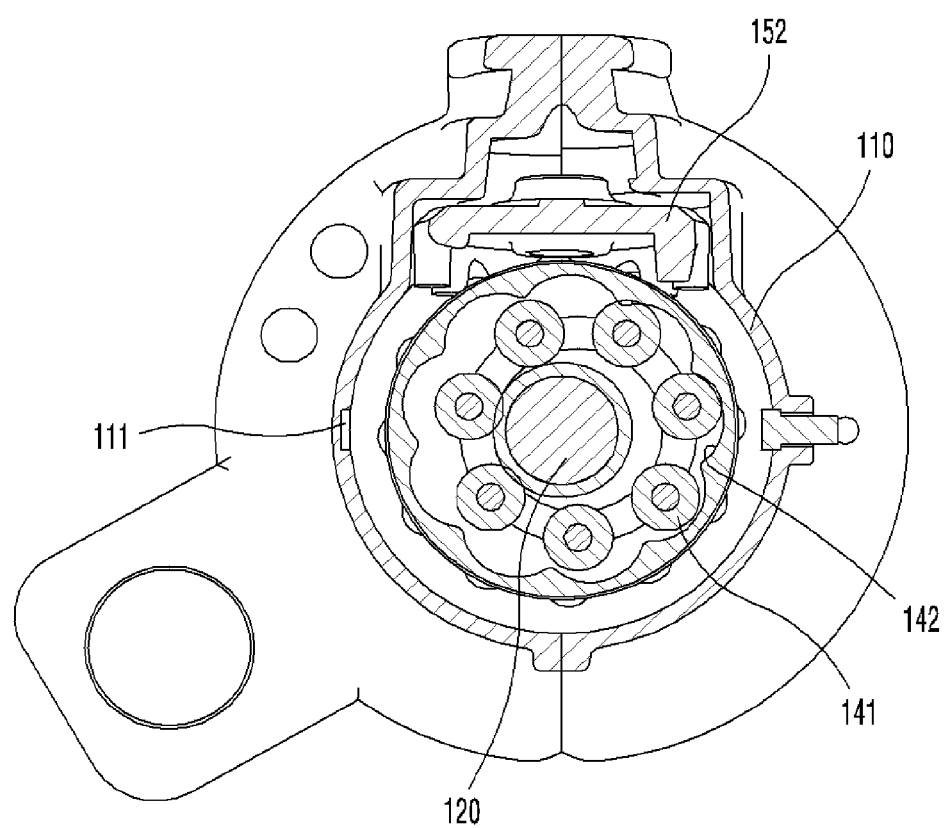

The coarse adjustment gearshift 140 is movable along the guide path 111 formed on an inner wall of the housing 110 by the operation of the shift lever transmitted through a coupling end 143 which is extended from one end of the main shaft 120, as shown in FIGS. 2a, 2b and 4b. The coarse adjustment gearshift 140 is used as an internal gear, in which the coarse adjustment gearshift is selectively connected to the two outputs 130a and 133b of the fine adjustment gearshift 130 to receive the driving force from any one of two paths and thus connect any one of the outputs 130a and 133b with the low- or high-speed coarse adjustment stage.

The coarse adjustment gearshift 140 includes a roller type pinion 141 installed on an eccentric shaft and having a sleeve type input 140a receiving the driving force by selective engagement with or disengagement from the outputs 130a and 133b of the fine adjustment gearshift 130, an internal gear 142 meshed with the pinion 141, and first and second outputs 140b and 140c each provided on the end of the pinion 141 and the end of the internal gear 142 and outputting the driving force to the output part 150 through the spline coupling with the output part 150 by the operation of the shift lever.

Figure 2C:
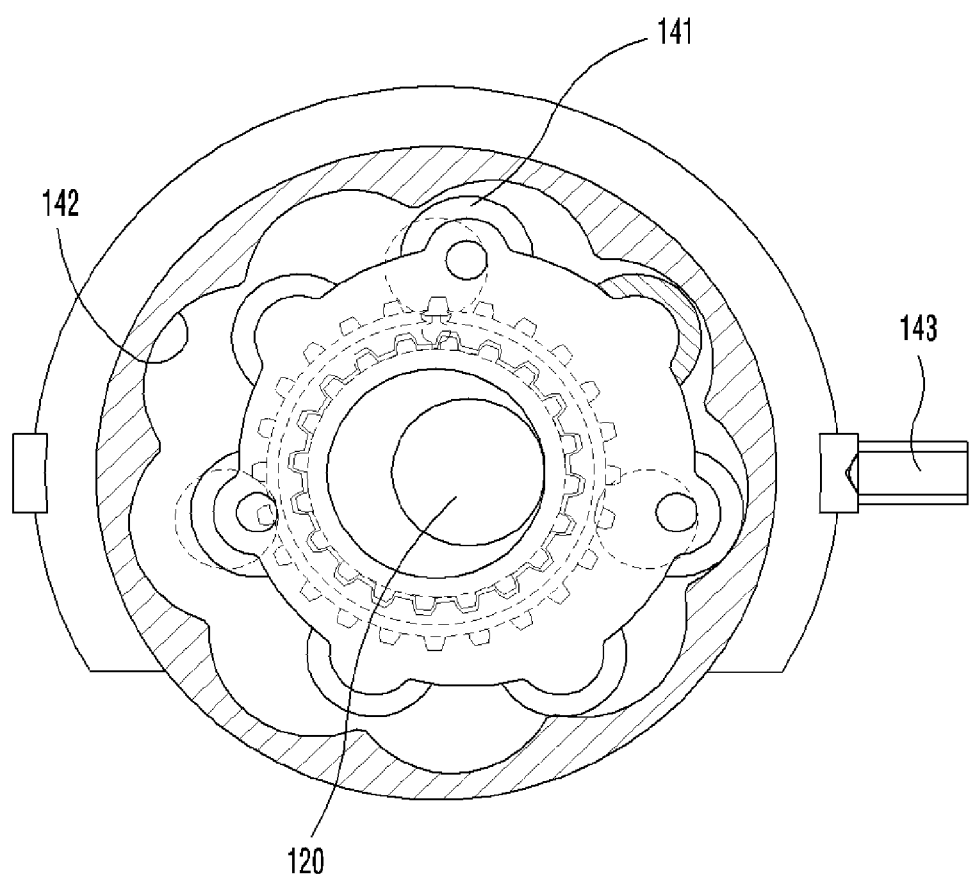
FIG. 2c is a cross-sectional view taken along line A-A in FIG. 2b.

In the mesh relationship between the pinion 141 and the internal gear 142 of the coarse adjustment gearshift 140 to obtain proper transmission, if the pinion 141 has 7 teeth, as shown in FIG. 2c, the internal gear 142 has 9 teeth.

The output part 150 is installed on the main shaft 120, and is connected to the outputs of the coarse adjustment gearshift to receive the driving force by the cross-coupling power transmitting manner.

The output part 150 has a roller type gear 151 with first and second inputs 150a and 150b which are selectively connected to the respective first and second outputs 140b and 140c of the coarse adjustment gearshift 140 by the spline coupling to receive the driving force, and a crown type gear 152 cross-coupled to the roller type gear 151.

The crown type gear 152 has an interlock rod 220 for transmitting the power to the load.

With the construction of the transmission according to the present invention, the shift process is performed from the respective low- and high-speed stages of the coarse adjustment to the 1-, 2-, or 3-stage of the fine adjustment.

The shift process of the transmission according to the present invention will now be described with reference to FIGS. 5a to 5e.

Figure 5A:
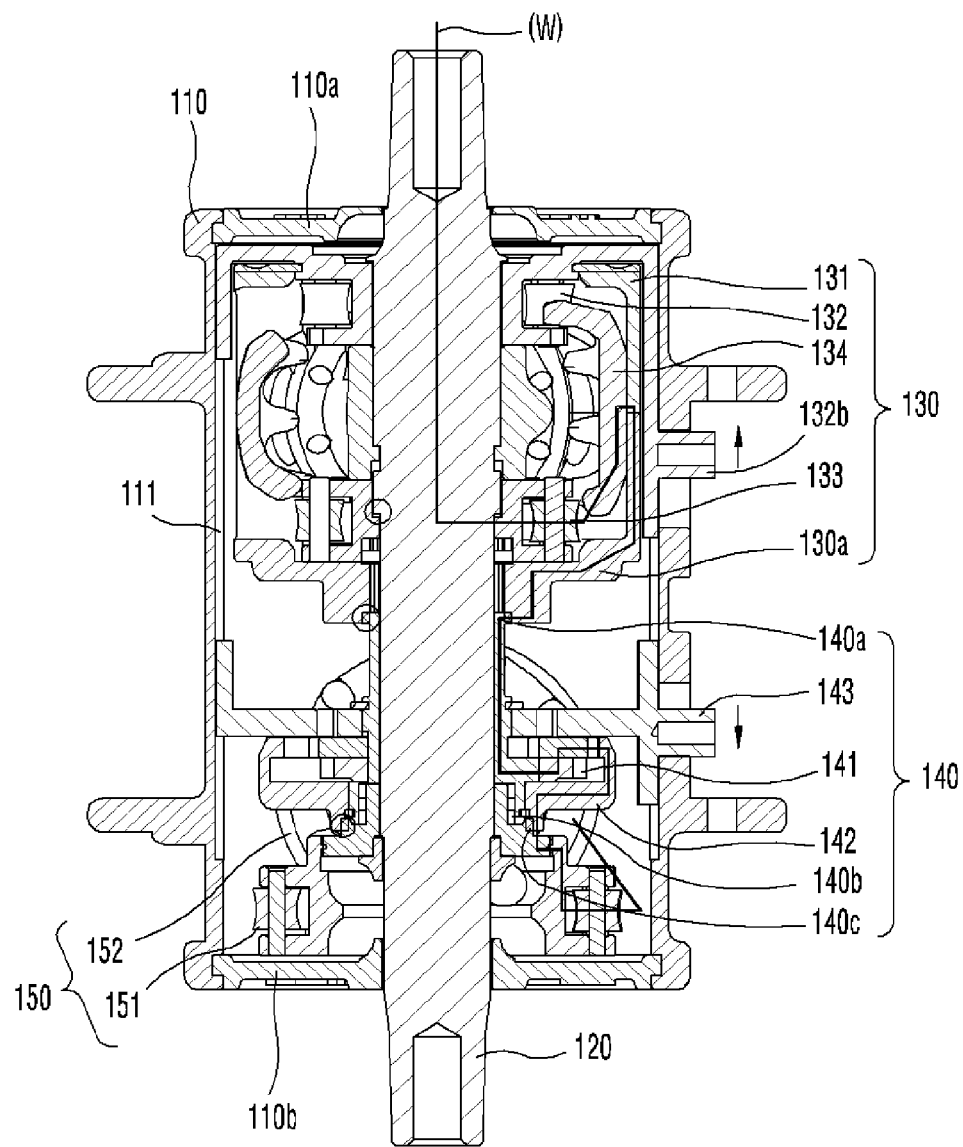
Figure 5B:
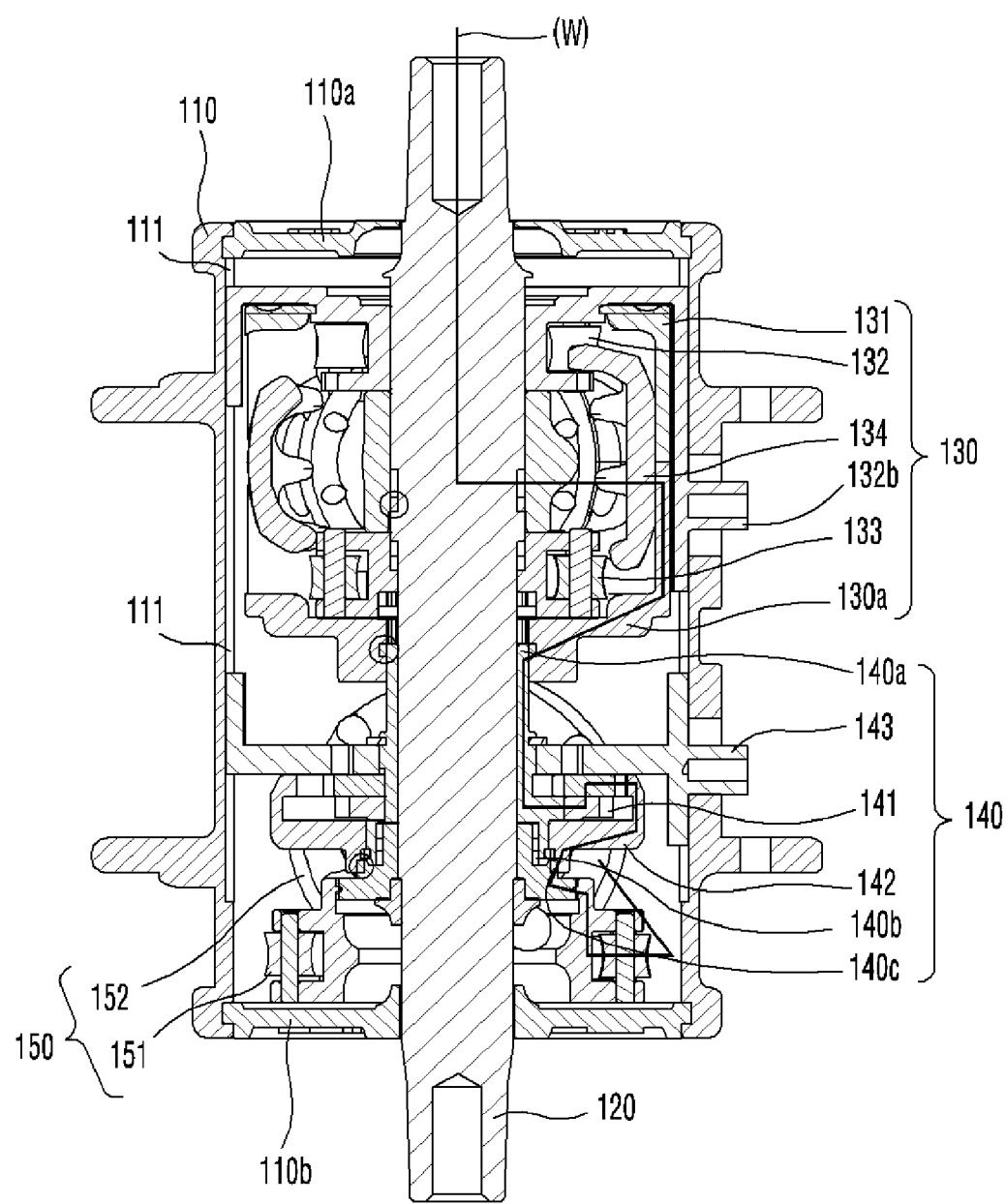

FIGS. 5a and 5b show the low-speed shift step, in which FIG. 5a shows a low-speed 1 stage. The fine adjustment gearshift 130 is moved in a left direction by the operation of the shift lever, while the coarse adjustment gearshift 140 is moved in a right direction.

Referring to the power transmitting path indicated by the arrow W in the drawings, the driving force is transmitted to the movable side gear 133 from the main shaft 120 through the input 133a of the movable side gear 133 of the fine transmission gearshift 130 to rotate the movable side gear 133, and the pinion 134 meshed with the movable side gear 133 is turned to rotate the casing 131.

The driving force transmitted to the casing 131 is outputted to the first output 130a of the fine adjustment gearshift 130, and then the driving force is transmitted to the pinion 141 and the internal gear 142 through the input 140a of the coarse adjustment gearshift 140. Then, the driving force is transmitted to the first input 150a of the output part 150 through the second output part 140c.

The driving force transmitted to the output part 150 is outputted to the interlock rod 220 through the roller type gear 151 and the crown type gear 152 to reduce the speed at a shift ratio of 0.11. Herein, the gear ratio means the rotation number of the output part 150 per one rotation of the main shaft 120.

FIG. 5b shows a low-speed 2 stage, in which the fine adjustment gearshift 130 is moved to a neutral position by the operation of the shift lever, and the coarse adjustment gearshift 140 is positioned at a right side, like the low-speed 1 stage. In this instance, the driving force is transmitted from the main shaft 120 to the input 134a provided on the pinion 134 of the fine adjustment gearshift 130, as the power transmitting path indicated by the arrow W in the drawings, so that the pinion 134 is rotated by the driving force directly transmitted through a path different from that of the low-speed 1 stage to rotate the casing 131.

The driving force transmitted to the casing 131 is outputted to the first output 130a of the fine adjustment gearshift 130, and then is transmitted to the first input 150a of the output part 150 through the input 140a of the coarse adjustment gearshift 140, the pinion 141 and the internal gear 142, and the second output 140c in order.

And, the driving force transmitted to the output part 150 is outputted to the interlock rod 220 through the roller type gear 151 and the crown type gear 152 to reduce the speed at a shift ratio of 0.22.

Figure 5C:
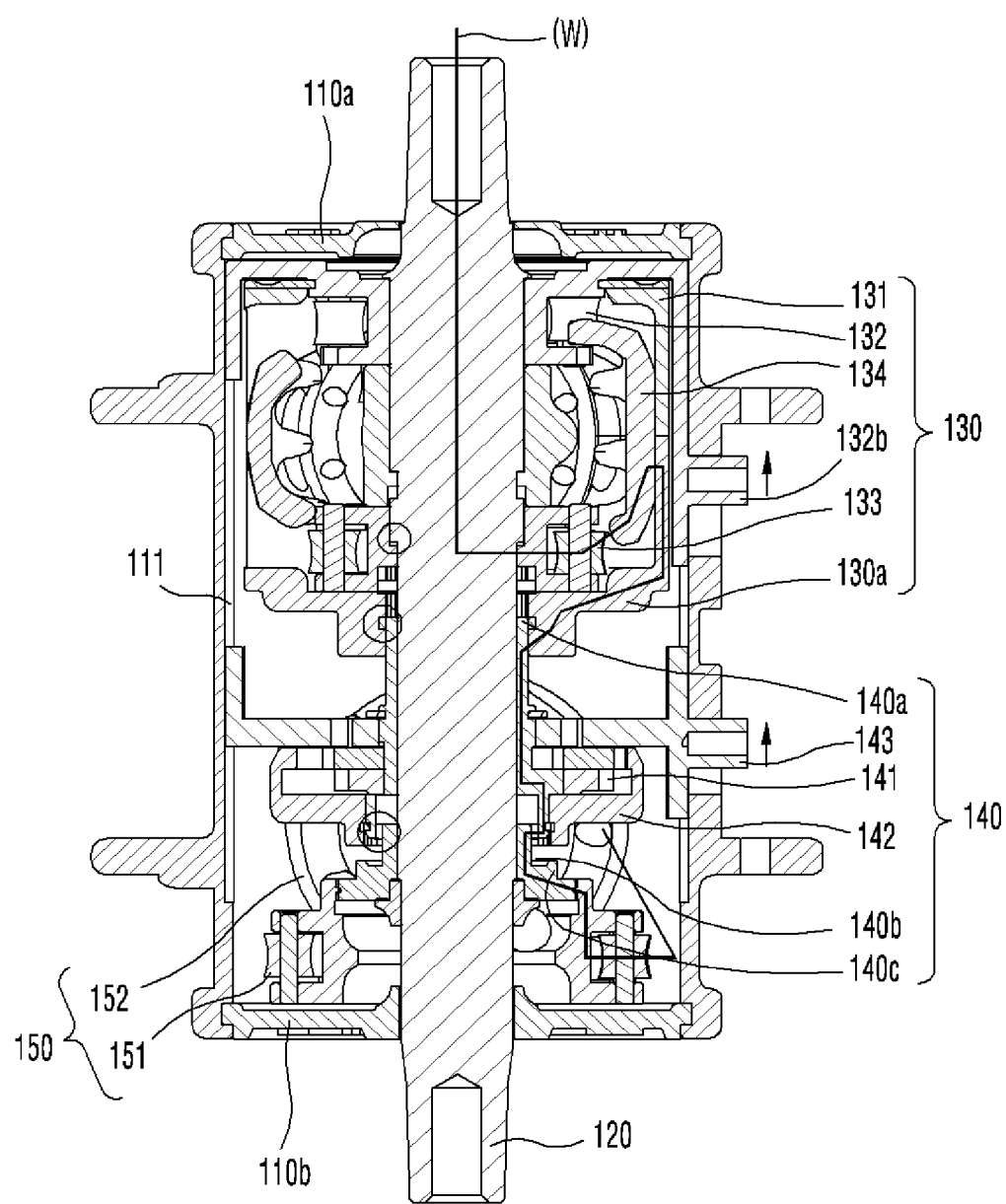
Figure 5D:
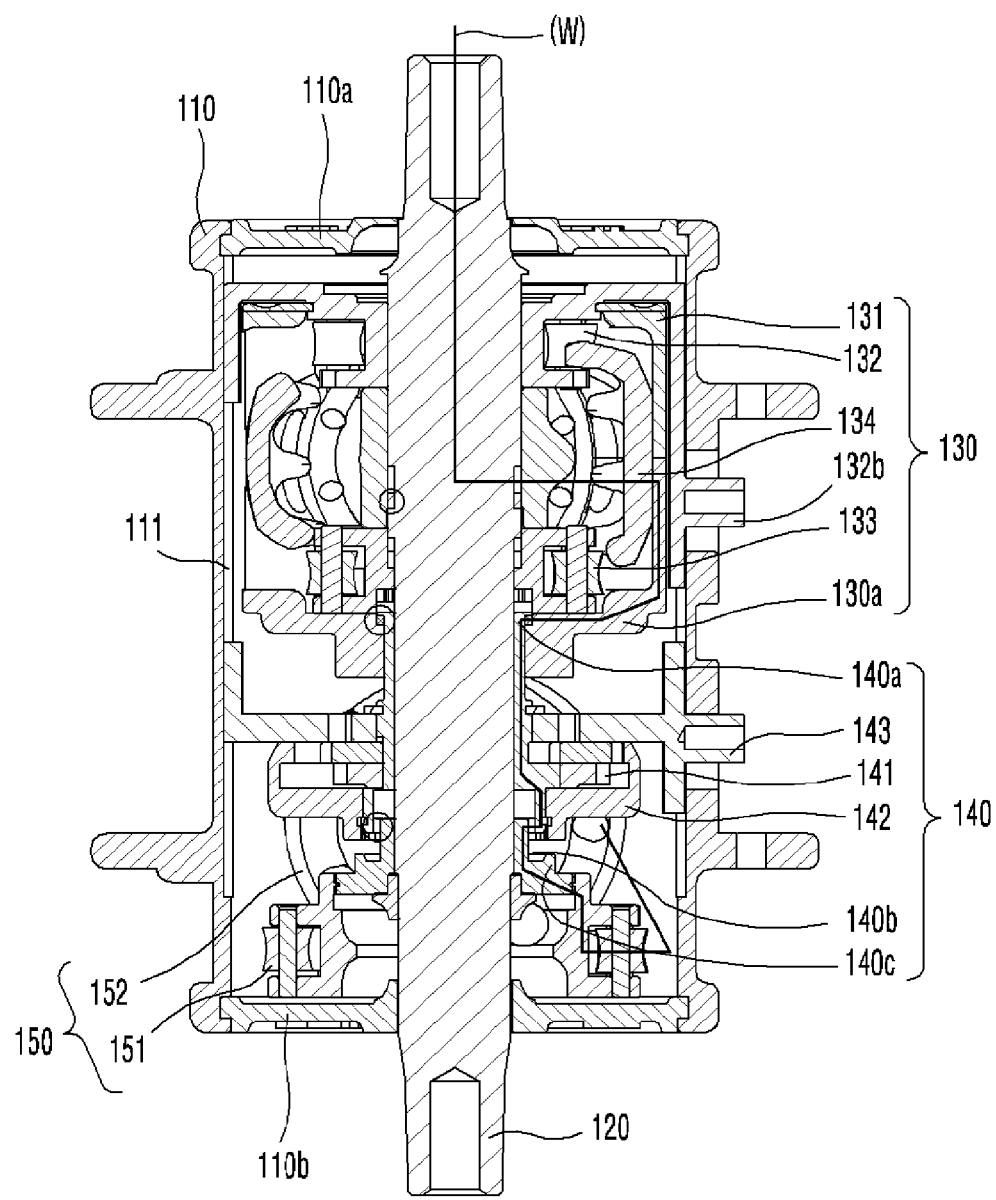
Figure 5E:
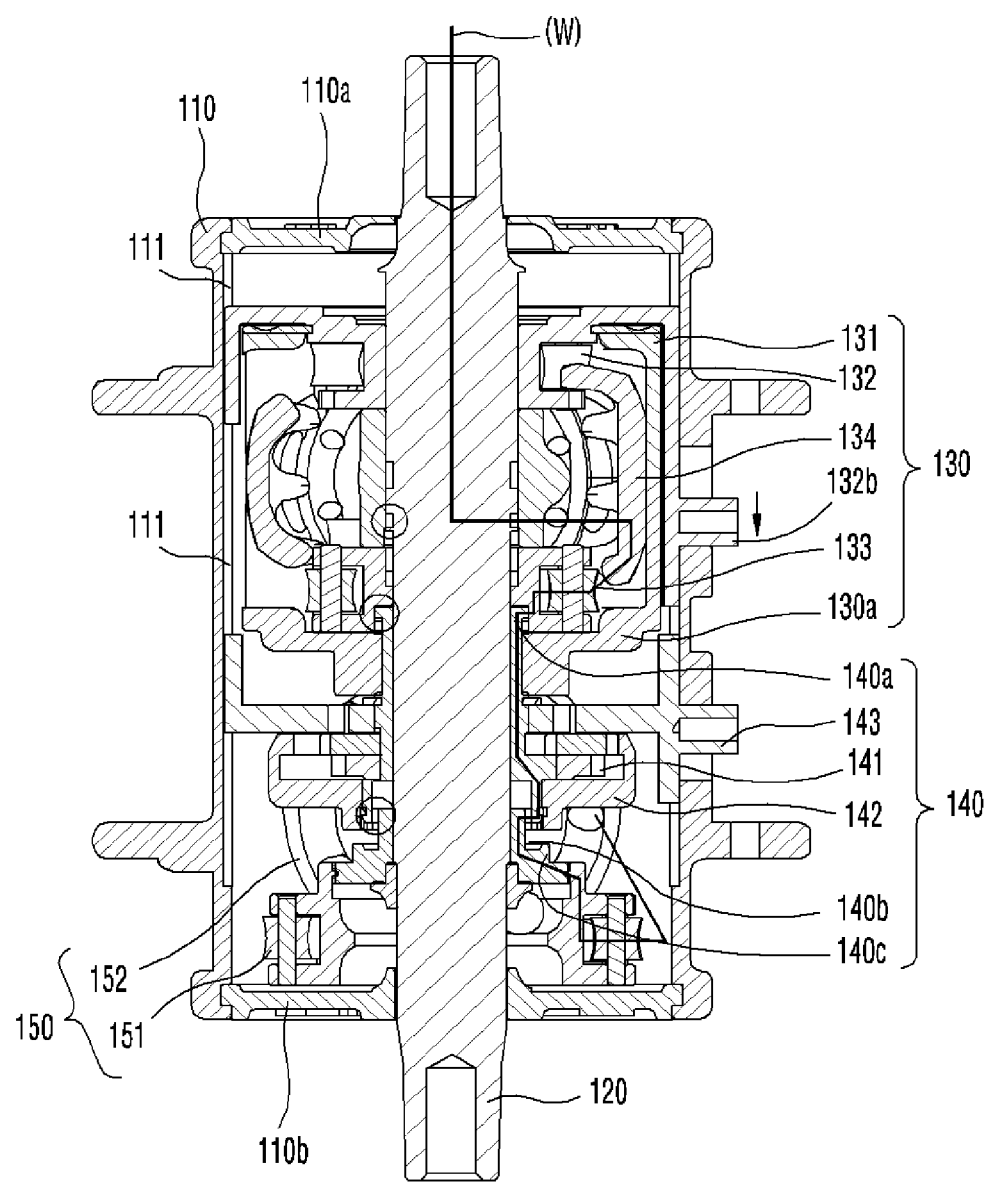

FIGS. 5c to 5e show the high-speed shift step, in which FIG. 5c shows a high-speed 1 stage. The fine adjustment gearshift 130 is moved in a left direction by the operation of the shift lever, while the coarse adjustment gearshift 140 is moved in a left direction.

Referring to the power transmitting path indicated by the arrow W in the drawings, the driving force is transmitted to the movable side gear 133 from the main shaft 120 through the input 133a of the movable side gear 133 of the fine transmission gearshift 130 to rotate the movable side gear 133, and the pinion 134 meshed with the movable side gear 133 is turned to rotate the casing 131.

The driving force transmitted to the casing 131 is outputted to the first output 130a of the fine adjustment gearshift 130, and then the driving force is transmitted to the second input 150b of the output part 150 through the input 140a of the coarse adjustment gearshift 140, the pinion 141 and the first output 140b.

The driving force transmitted to the output part 150 is outputted to the interlock rod 220 through the roller type gear 151 and the crown type gear 152 to increase the speed at a shift ratio of 0.5.

FIG. 5d shows a high-speed 2 stage, in which the fine adjustment gearshift 130 is moved to a neutral position by the operation of the shift lever, and the coarse adjustment gearshift 140 is positioned at a left side, like the high-speed 1 stage.

In this instance, the driving force is transmitted from the main shaft 120 to the input 134a provided on the pinion 134 of the fine adjustment gearshift 130, as the power transmitting path indicated by the arrow W in the drawings, so that the pinion 134 is rotated by the driving force directly transmitted through a path different from that of the high-speed 1 stage to rotate the casing 131.

The driving force transmitted to the casing 131 is outputted to the second output 130b of the fine adjustment gearshift 130, and then is transmitted to the second input 150b of the output part 150 through the input 140a of the coarse adjustment gearshift 140, the pinion 141, and the first output 140b in order.

And, the driving force transmitted to the output part 150 is outputted to the interlock rod 220 through the roller type gear 151 and the crown type gear 152 to increase the speed at a shift ratio of 1.

FIG. 5e shows a high-speed 3 stage, in which the fine adjustment gearshift 130 is moved to a right position by the operation of the shift lever, and the coarse adjustment gearshift 140 is positioned at the left side, like the high-speed 1 stage.

In this instance, the driving force is transmitted from the main shaft 120 to the input 134a provided on the pinion 134 of the fine adjustment gearshift 130, as the power transmitting path indicated by the arrow W in the drawings, so that the driving force is directly transmitted to the pinion 134 through the same path as that of the high-speed 2 stage.

The pinion 134 is rotated by the transmitted driving force. In this instance, the pinion 134 rolls along the stationary side gear 132, and the rotation force of the pinion 134 is transmitted to the movable side gear 133 to output the driving force through the second output 133b.

The driving force outputted to the second output 133b of the movable side gear 133 is transmitted to the second input 150b of the output part 150 through the input 140a of the coarse adjustment gearshift 140, the pinion 141, and the first output 140b in order.

And, the driving force transmitted to the output part 150 is outputted to the interlock rod 220 through the roller type gear 151 and the crown type gear 152 to increase the speed at a shift ratio of 2.

The transmission of the present invention can easily perform the shift of wide range comprising the low-speed rotation and the high-speed rotation, since the coarse adjustment gearshift 130 and the fine adjustment gearshift 140 are selected by the operation of the shift lever.

Figure 6:
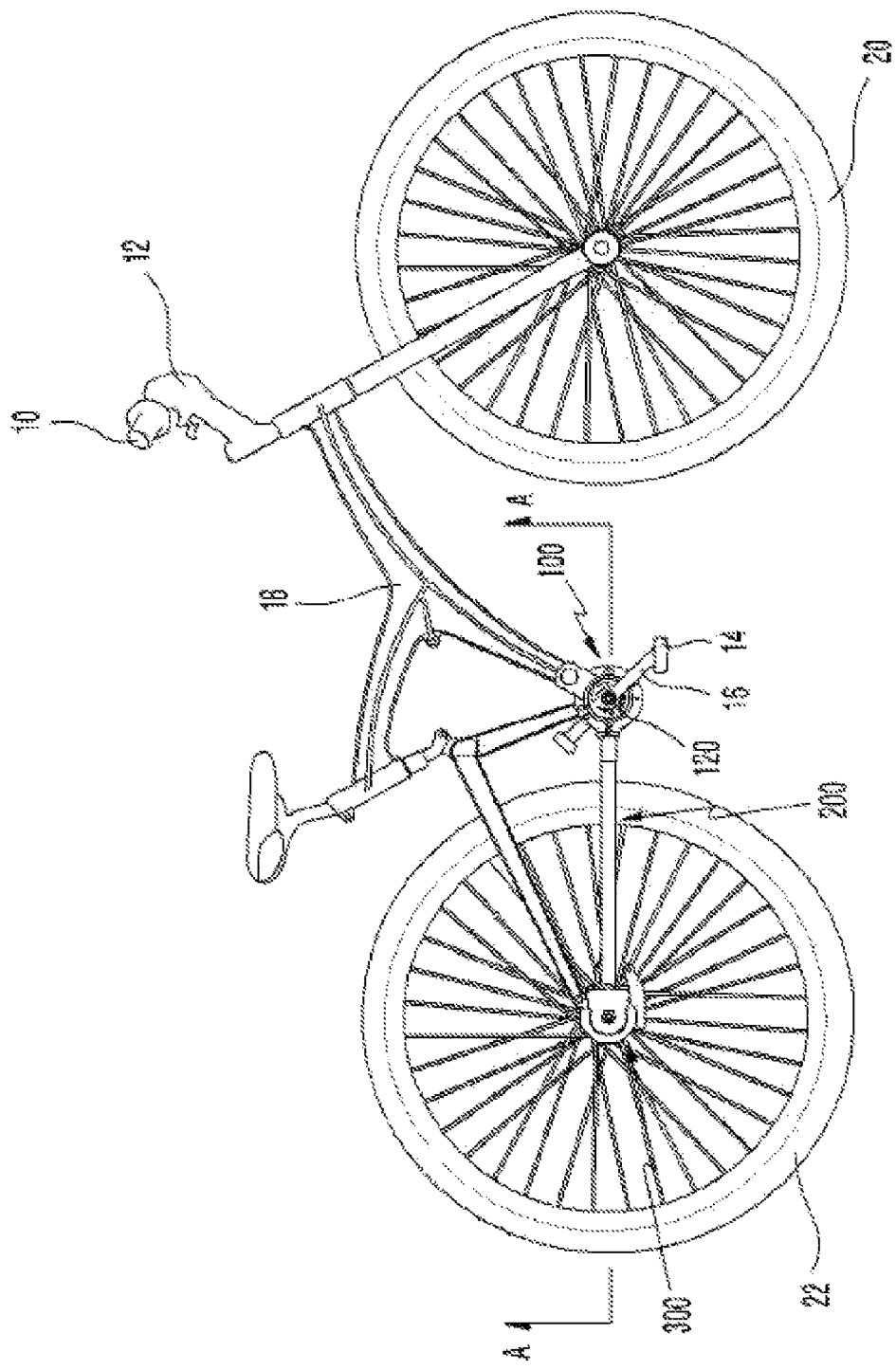
FIG. 6 is a side view of a bicycle according to another embodiment of the present invention.
Figure 7:
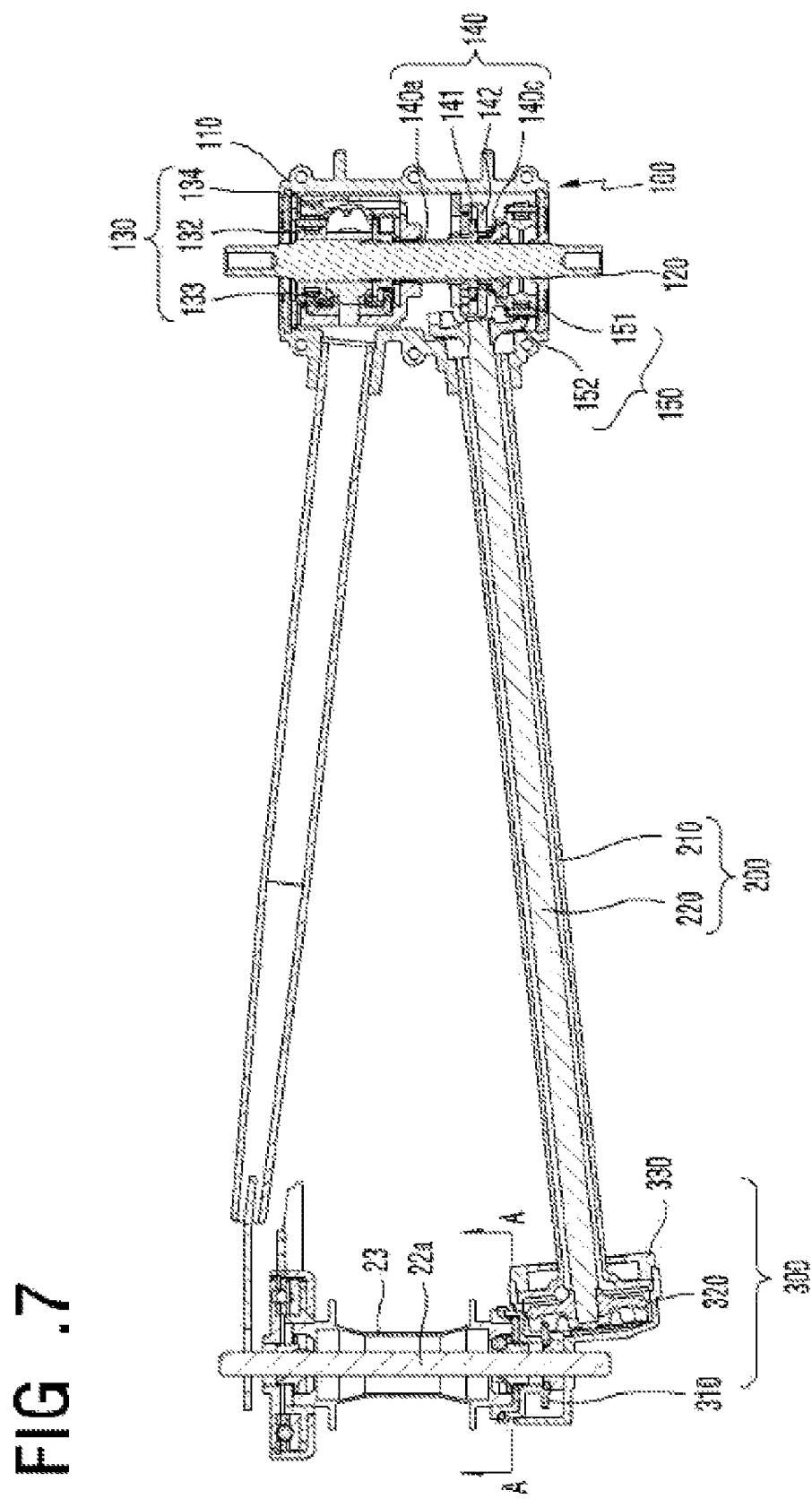
FIG. 7 is a cross-sectional view taken along line A-A in FIG. 6.

FIGS. 6 and 7 show another embodiment of the present invention, in which a chainless bicycle of non-motor type including a power train having the transmission is shown as one example of two-wheeled or four-wheeled transport device.

The chainless bicycle includes a crank arm 16 having a handle bar 12 and a pedal 14, the handle bar 12 having a shift lever 10, a frame 18 rotatably supporting the crank arm 16 by using a main shaft 120, and front and rear wheels 20 and 22 installed at front and rear portions of the frame 18, in which a driving force generated from the crank arm 16 is transmitted to the rear wheel 22 in a cross-coupling transmitting manner via a driving unit 100, a power train unit 200 and a driven unit 300.

More specifically, the driving unit 100 includes a fine adjustment gearshift 130, an output part 150 which are installed on the main shaft 120 of the crank arm 16, as described above the transmission. The driving force of the crank arm 16 is effectively shifted in accordance with the driving conditions by operation of the shift lever, while maintaining the shift range of high and low speed.

The power train unit 200 is cross-coupled to the output part 150 of the driving unit 100 to transmit the driving force generated from the output part 150 to the driven unit 300 of the rear wheel 22 which corresponds to a load. The power train unit 200 includes a pipe-shaped case 210 connected to both ends of the respective driving and driven units 100 and 300, and an interlock rod 220 connected to the driven unit 300 and the output unit 150 of the driving unit 100 at both ends thereof.

The driven unit 300 installed on the rear wheel 22 includes a roller type gear 310 coupled to the shaft 22a of the rear wheel 22, a crown type gear 320 cross-coupled to the roller type gear 310 and receiving the driving force of the crank arm 16 through the power train unit 200, and a housing 330 enclosing the gears 310 and 320.

Figure 8:
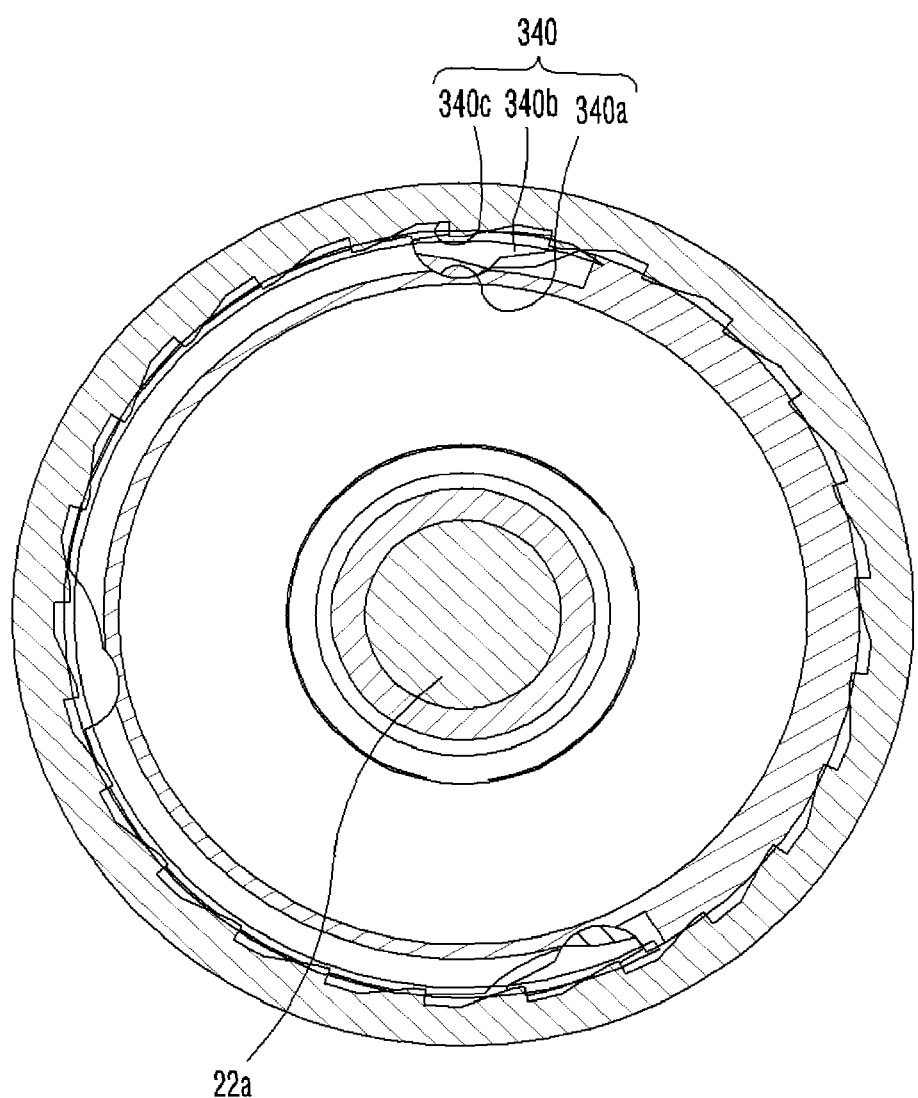
FIG. 8 is a cross-sectional view taken along line A-A in FIG. 7.

The driven gear 300 also includes a latch structure 340 for transmitting the driving force of the crank arm from the driving unit 100 through the power train unit 200 in one way, as shown in FIG. 8.

The latch structure 340 is interposed between the hub 23 of the rear wheel 22 and the roller type gear 310. The latch structure 340 includes a receiving groove 340a formed on any one of a hub 23 and a roller type gear 310, a claw 340b moving around the receiving groove, and a claw wheel 340c formed on an inner periphery of the roller type gear 310. In case where the pedal is driven in a forward direction, the power is transmitted to the rear wheel 22, while in case where the pedal is driven in a reverse direction, the power is not transmitted.

The forgoing embodiment is merely exemplary and is not to be construed as limiting the present invention. The present teachings can be readily applied to other types of apparatus. The description of the present invention is intended to be illustrative, and not to limit the scope of the claims. Many alternatives, modifications, and variations will be apparent to those skilled in the art.

What is claimed is:

1. A transmission operated by a shift lever in a power train device for a transport device of motor type or non-motor type, the transmission comprising:
    a main shaft rotated by a driving power;
    a fine adjustment gearshift of differential gear type connected to the main shaft and moved by the shift lever to receive the driving force from any one of two paths and transmit the driving force to any one of two output in multiple stages;
    a coarse adjustment gearshift of internal gear type being movable on the main shaft by the shift lever and connected to the outputs of the fine adjustment gearshift to receive the driving force from any one of two paths and transmit the driving force to any one of two output in a low or high stage;
    an output part installed on the main shaft and selectively connected to the outputs of the coarse adjustment gearshift to receive and output the driving force in a cross-coupling power transmitting manner; and
    a housing enclosing the fine adjustment gearshift, the coarse adjustment gearshift and the output part,
    in which the fine adjustment gearshift, the coarse adjustment gearshift and the output part are selectively connected to each other by operation of the shift lever to perform multi-stage fine adjustment at the respective low- and high-speed coarse adjustment stages.

2. The transmission as claimed in claim 1, wherein the fine adjustment gearshift includes a casing having a first output at a distal end thereof, a stationary side gear idling on the main shaft, a movable side selectively connected to or disconnected from the main shaft and having a second output at a distal end thereof, and at least one pinion meshed with the stationary or movable side gear and connected to or disconnected from the main shaft to rotate the pinion.

3. The transmission as claimed in claim 1, wherein the coarse adjustment gearshift includes a roller type pinion having a sleeve type input which is connected to the output of the fine adjustment gearshift to receive the driving force, an internal gear meshed with the pinion, and first and second outputs each provided on an end of the pinion and an end of the internal gear and selectively outputting the driving force to the output part through any one of the paths.

4. The transmission as claimed in claim 1, wherein the output part has a roller type gear with first and second inputs which are selectively connected to the respective first and second outputs of the coarse adjustment gearshift, and a crown type gear cross-coupled to the roller type gear.

5. The transmission as claimed in claim 1, wherein a guide path is formed on an inner wall of the housing to guide movement of the fine adjustment gearshift and coarse adjustment gearshift by operation of the shift lever.

6. The transmission as claimed in claim 1, wherein the transport device is one of a bicycle and a wagon.

7. A transport device including a crank arm having a handle bar and a pedal, the handle bar having a shift lever, a frame rotatably supporting the crank arm by using a main shaft, and front and rear wheels installed at front and rear portions of the frame, in which a driving force generated from the crank arm is transmitted to the rear wheel in a cross-coupling power transmitting manner using a crown type gear and a roller type gear, the transport device comprising:
    a driving unit including a fine adjustment gearshift of differential gear type connected to the main shaft and selectively moved by the shift lever to change a speed in multiple stages, and a coarse adjustment gearshift of internal gear type and connected to transmit the driving force in a low or high stage;
    a power train unit cross-coupled to an output part of the driving unit to transmit the driving force generated from the output part to a load; and
    a driven unit installed on the rear wheel and receiving the driving force from the power train unit to drive the wheel.

8. The transport device as claimed in claim 7, wherein the fine adjustment gearshift includes a casing having a first output at a distal end thereof, a stationary side gear idling on the main shaft, a movable side selectively connected to or disconnected from the main shaft and having a second output at a distal end thereof, and at least one pinion meshed with the stationary or movable side gear and connected to or disconnected from the main shaft to rotate the pinion.

9. The transport device as claimed in claim 7, wherein the coarse adjustment gearshift includes a roller type pinion having a sleeve type input which is connected to the output of the fine adjustment gearshift to receive the driving force, an internal gear meshed with the pinion, and first and second outputs each provided on an end of the pinion and an end of the internal gear and selectively outputting the driving force to the output part through any one of the paths.

10. The transport device as claimed in claim 7, wherein the output part of the driving unit has a roller type gear with first and second inputs which are selectively connected to the respective first and second outputs of the coarse adjustment gearshift, and a crown type gear cross-coupled to the roller type gear and connected to the power train unit.

11. The transport device as claimed in claim 10, wherein the fine adjustment gearshift, the coarse adjustment gearshift and the output part are selectively connected to each other by the shift lever to change a speed in a multiple level at low or high speed.

12. The transport device as claimed in claim 10, wherein the power train unit includes a pipe type case connected to the driving unit and driven unit at both ends thereof, and an interlock rod connected to the output part of the driving unit and the crown type gear of the driven gear in the case.

13. The transport device as claimed in claim 7, wherein the driven unit has a roller type gear connected to a shaft of the rear wheel, and a crown type gear cross-coupled to the roller type gear to receive the driving force from the driving unit.

14. The transport device as claimed in claim 13, wherein the fine adjustment gearshift, the coarse adjustment gearshift and the output part are selectively connected to each other by the shift lever to change a speed in a multiple level at low or high speed.

15. The transport device as claimed in claim 13, wherein the power train unit includes a pipe type case connected to the driving unit and driven unit at both ends thereof, and an interlock rod connected to the output part of the driving unit and the crown type gear of the driven gear in the case.

16. The transport device as claimed in claim 7, wherein the fine adjustment gearshift, the coarse adjustment gearshift and the output part are selectively connected to each other by the shift lever to change a speed in a multiple level at low or high speed.

17. The transport device as claimed in claim 7, wherein the power train unit includes a pipe type case connected to the driving unit and driven unit at both ends thereof, and an interlock rod connected to the output part of the driving unit and the crown type gear of the driven gear in the case.

18. The transport device as claimed in claim 7, wherein the driven gear includes a latch structure for transmitting the driving force of the crank arm from the driving unit through the power train unit in one way.

* * * * *